(12) United States Patent
Trela

(10) Patent No.: US 12,338,150 B2
(45) Date of Patent: Jun. 24, 2025

(54) NEGATIVE PRESSURE AERATION AND ORGANIC GROWTH SUPPRESSION SYSTEM

(71) Applicant: Richard S. Trela, Tampa, FL (US)

(72) Inventor: Richard S. Trela, Tampa, FL (US)

(*) Notice: Subject to any disclaimer, the term of this patent is extended or adjusted under 35 U.S.C. 154(b) by 270 days.

(21) Appl. No.: 17/878,980

(22) Filed: Aug. 2, 2022

(65) Prior Publication Data

US 2023/0068072 A1 Mar. 2, 2023

Related U.S. Application Data

(63) Continuation-in-part of application No. 16/043,723, filed on Jul. 24, 2018, now abandoned.

(60) Provisional application No. 62/536,001, filed on Jul. 24, 2017.

(51) Int. Cl.
| | |
|---|---|
| *C02F 7/00* | (2006.01) |
| *C02F 1/00* | (2023.01) |
| *B63B 13/00* | (2006.01) |
| *B63J 2/00* | (2006.01) |
| *C02F 103/08* | (2006.01) |

(52) U.S. Cl.
CPC ............... *C02F 7/00* (2013.01); *C02F 1/004* (2013.01); *B63B 2013/005* (2013.01); *B63J 2002/005* (2013.01); *C02F 2103/08* (2013.01); *C02F 2201/001* (2013.01)

(58) Field of Classification Search
None
See application file for complete search history.

(56) References Cited

U.S. PATENT DOCUMENTS

| | | | | |
|---|---|---|---|---|
| 5,932,112 | A * | 8/1999 | Browning, Jr. ........... | C02F 1/20 210/764 |
| 2005/0139531 | A1* | 6/2005 | Gordon .................. | B01D 29/68 210/485 |
| 2011/0100804 | A1* | 5/2011 | Krone ................. | E02B 17/0017 204/242 |

OTHER PUBLICATIONS https://www.youtube.com/watch?v=r_IlrR_Y4_UM "Waterfall Flow & Airlocks in Pipes Explained".

* cited by examiner

*Primary Examiner* — Richard C Gurtowski
(74) *Attorney, Agent, or Firm* — SteinPatent, P.A.; Stefan V. Stein

(57) ABSTRACT

A negative pressure aeration system, created by atmospheric siphon pressure above the waterline and mechanical pump suction below the waterline, which impedes the growth of organic matter. A waterfall flow in vacuum effect is created within a system that aerates the raw water as it falls through the air chamber of the system housing, which assists in the suppression of organic growth by reducing the contact surface area within the system. A chemical tank allows an anti-fouling chemical to be added to the entire system and a power supply allows flexible electrodes driven by a vacuum to create a further anti-fouling benefit throughout the components of the system.

25 Claims, 16 Drawing Sheets

NEGATIVE PRESSURE AERATION AND ORGANIC GROWTH SUPPRESSION SYSTEM

CROSS-REFERENCE TO RELATED APPLICATIONS

This application is a continuation-in-part application of Ser. No. 16/043,723 filed Jul. 24, 2018, which claims priority to provisional application Ser. No. 62/536,001, filed Jul. 24, 2017, the disclosures of which are hereby incorporated by reference herein.

BACKGROUND OF THE INVENTION

Field of the Invention

This invention relates to a negative pressure aeration and organic growth suppression system to collect solid marine debris at the inlet of a seawater cooling system for marine craft and to create a waterfall flow to suppress marine growth and accumulation of marine debris throughout the marine craft's cooling system.

Description of the Background Art

Presently, marine seawater cooling (or heating) systems utilize seawater flowing throughout a marine craft's cooling (or heating) system. Raw seawater is pumped through a strainer through a seacock installed through the craft's hull. The strainer usually includes a strainer basket that collects marine debris flowing therethrough. The now-strained seawater is further pumped throughout the craft's cooling system, typically comprising a heat exchanger, such as air conditioning condenser coils (or evaporator coils in the case of a heat pump). After the strained seawater exits the heat exchanger, the now heated water (or cooled water in the case of a heat pump) is discarded back into the sea.

To preclude trapped bubbles in the strainer, which potentially could result in an airlock, the inlet and outlet ports of prior art strainers are positioned above the strainer basket. It is noted that prior art strainers are oftentimes installed in the craft's bilge below the craft's water line such that priming of the pump is not necessary. Positioning the water pump below the craft's bilge below the waterline reduces buildup of bubbles.

Therefore, it is an object of this invention to provide an improvement, which overcomes the aforementioned inadequacies of the prior art devices and provides an improvement, which is a significant contribution to the advancement of negative pressure aeration and organic growth suppression systems.

Another object of this invention is to provide a means for suppressing the accumulation and growth of organic matter and marine debris by a seawater strainer having an inlet port positioned above the strainer's strainer basket to create a waterfall flow of incoming seawater within the strainer to aerate the incoming seawater.

Another object of this invention is to provide an antifouling, gravity-fed chemical tank to aid in the addition and distribution of anti-fouling chemicals to the entire system.

Another object of this invention is to provide an electrode assembly to further prevent the accumulation and growth of organic matter and marine debris.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a negative pressure aeration and organic growth suppression system. The system causes the raw unstrained seawater to "waterfall" flow (WF) from the inlet port within a first chamber, optionally through the strainer, to the outlet port. See generally: https://www.youtube.com/watch?v=r_1rR_Y4_UM [(59) Waterfall Flow & Airlocks in Pipes Explained—YouTube] (last visited Jun. 23, 2022) As employed advantageously in the present invention, this waterfall flow WF effect aerates the raw seawater in the housing, between the higher inlet and the lower outlet port. The waterfall flow reduces the residence time of the water, thus suppressing accumulation and growth of debris and organic matter during the straining process. The strainer is configured to have many sieve holes as desired to catch/strain both large and small debris.

The housing of the system may include an optional access port that allows a user to access accumulated debris within the strainer. The port is airtight and large enough for the user to grasp the accumulated debris. Alternatively, the strainer may be removable for ease in cleaning. The user is able to access accumulations of debris, such as sea shells and grass, from the system that has been separated as part of the gravity fed, aerated waterfall flow during the strainer process.

The system may include a primer port that allows a "hot operation" water pump priming source to be added at any point during the operation of the air conditioning unit. This new method is in contrast to prior art seawater strainers whereby priming water can only be added by either opening a fully sealed system at a hose fitting or back-feeding from a dock through the outlet port of the air conditioning system.

As stated before, since the prior art places the strainer assembly below the boat's waterline (e.g., in the bilge), it must be structurally sound because any slight leak within the strainer assembly may cause large amounts of water to rush into the bilge of the boat, possibly resulting in sinking.

In the present invention, the housing is placed above the boat's waterline. As such, the raw water inlet hose, located below the boat's waterline, is attached to the housing's inlet port, located above the boat's waterline. This is an important safety issue as the risk in housing failure is limited to the siphon effect being interrupted due to the vacuum loss in the housing. In this case, the raw inlet water would just remain in the inlet hose at the external waterline level and not flood the bilge of the boat.

The primer port also enables a user to add liquids to the system, which will then be circulated throughout the entire air condition system. The liquids may include chemicals such as Barnacle Buster® or other system flushing additives.

In the embodiment summarized above, the system of the invention is installed within the confines of a boat above the boat's waterline to be in use at all times. In other embodiments that may be used while anchored or docked, the system of the invention is installed exteriorly of the boat, such as the boat's swim platform-mounted or dock-mounted, a portable embodiment to be seated onto the swim platform or on the dock.

The present invention also includes the use of an anti-fouling electrode assembly whereby the raw sea water is electrified via a direct current ("DC") power supply, thus helping prevent the accumulation and growth of subaquatic organisms. The electrode assembly are present throughout the inlet hose and the system. The DC power supply is 2-24 volts, which can be automatically turned on via an inline vacuum switch that operates so as to turn on the DC power supply when a vacuum is present during the operation of the pump and vice versa.

The system may be disposable. To accomplish this purpose, the system does not need an access port and the user does not need to clean the strainer of any accumulated debris. The system would be able to be manufactured with economic materials, such as aluminum or polyvinyl chloride. The user would wait until the prescribed period and then dispose of the system.

The system can further be used for cooling other systems in a vessel employing other types of heat exchanges, such as engine blocks and generator engines.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The negative pressure aeration and organic growth suppression system 10 of the present invention provides an efficient and effective apparatus and method for aerating the raw water and optionally for raw water straining to collect solid marine debris, such as sea grass. Aerating the raw water suppresses marine growth by reducing the water's residence time in the housing unit, which reduces the growth and accumulation of marine growth in the rest of the air conditioning system, such as in the up-line components of the system, condenser coils, etc.

Figure 1:
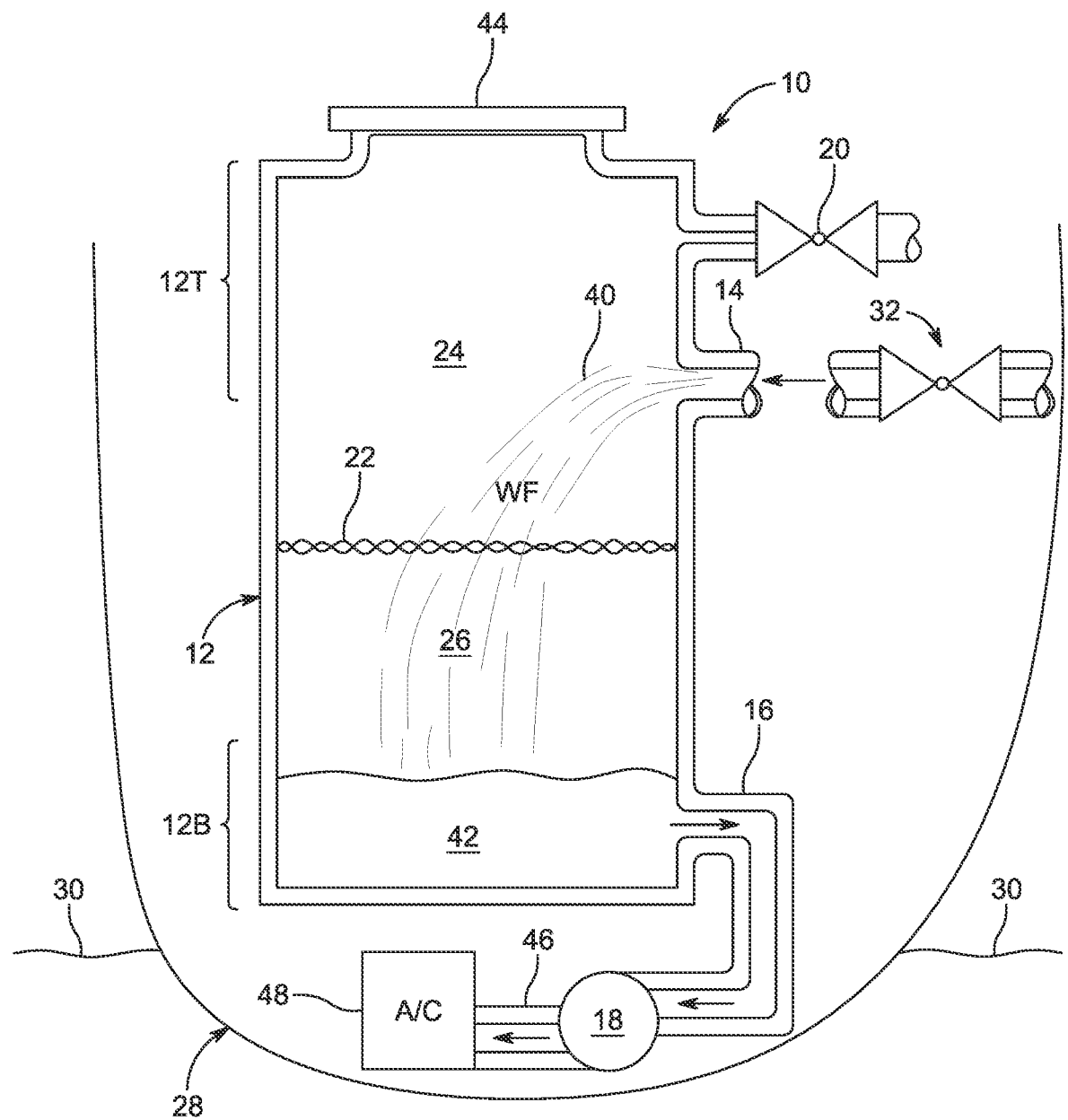
FIG. 1 is a schematic view of the negative pressure aeration and organic growth suppression system installed within the confines of a boat.

As shown in FIG. 1, one embodiment of the negative pressure aeration and organic growth suppression system 10 is intended to be installed within the confines of a boat 30 and comprises a watertight housing 12 having an inlet port 14 and an outlet port 16. The housing 12 is vertically oriented when installed such that the inlet port 14 is elevationally oriented above the outlet port 16; more preferably, with the inlet port 14 positioned at the top portion 12T of the housing 12 and the outlet port 16 positioned at the bottom portion 12B of the housing 12.

The inlet port 14 is fluidly connected to a source of cooling water such as seawater. A conventional marine pump 18 is fluidly connected to the outlet port 16 to create a negative pressure at the outlet port 16 thereby drawing seawater into the housing 12 via the inlet port 14.

The operational specifications of the pump 18 relative to the dimensions of the housing 12 and ports 14 & 16 are designed to impart a waterfall flow of seawater from the inlet port 14 within the housing 12 by creating sufficient negative pressure within the housing 12 to create the waterfall flow of seawater from the inlet port 14 based upon the dimensions of the housing 12 and ports 14 & 16 and the flow velocity, viscosity, density of seawater. It is noted that during start-up, it may be necessary to add water to the housing 12 via a primer inlet 20 to prime the housing 12 initiating water flow.

The housing 12 is preferably installed within the boat 28 elevationally above the waterline 30 of the seawater and elevationally higher than the pump 18 to maximize the pump's 18 efficiency due to a pressure siphon effect. As such, the system 10 is able to create a vertical height differential, thus allowing an atmospheric siphon pressure gradient to form, which allows the seawater to be effectively "pushed" into the pump 18, by way of being vertically higher than the pump 18. Since the seawater is pushed into the pump 18, the pump 18 necessarily uses less energy to provide sufficient fluid flow into the rest of the air conditioning system.

The system 10 may optionally include a strainer 22 for straining marine debris from the seawater. The strainer 22 may be positioned within the housing 12 between the inlet port 14 and the outlet port 16 to define an internal unstrained water chamber 24 within the housing 12 between the inlet port 14 and the strainer 22 and to define a strained water chamber 26 within the housing 12 between the outlet port 16 and the strainer 22. Alternatively, strainer 22 may be positioned fluidly proximate to the inlet port 14 to strain the incoming seawater before flowing into the housing 12.

Figure 2:
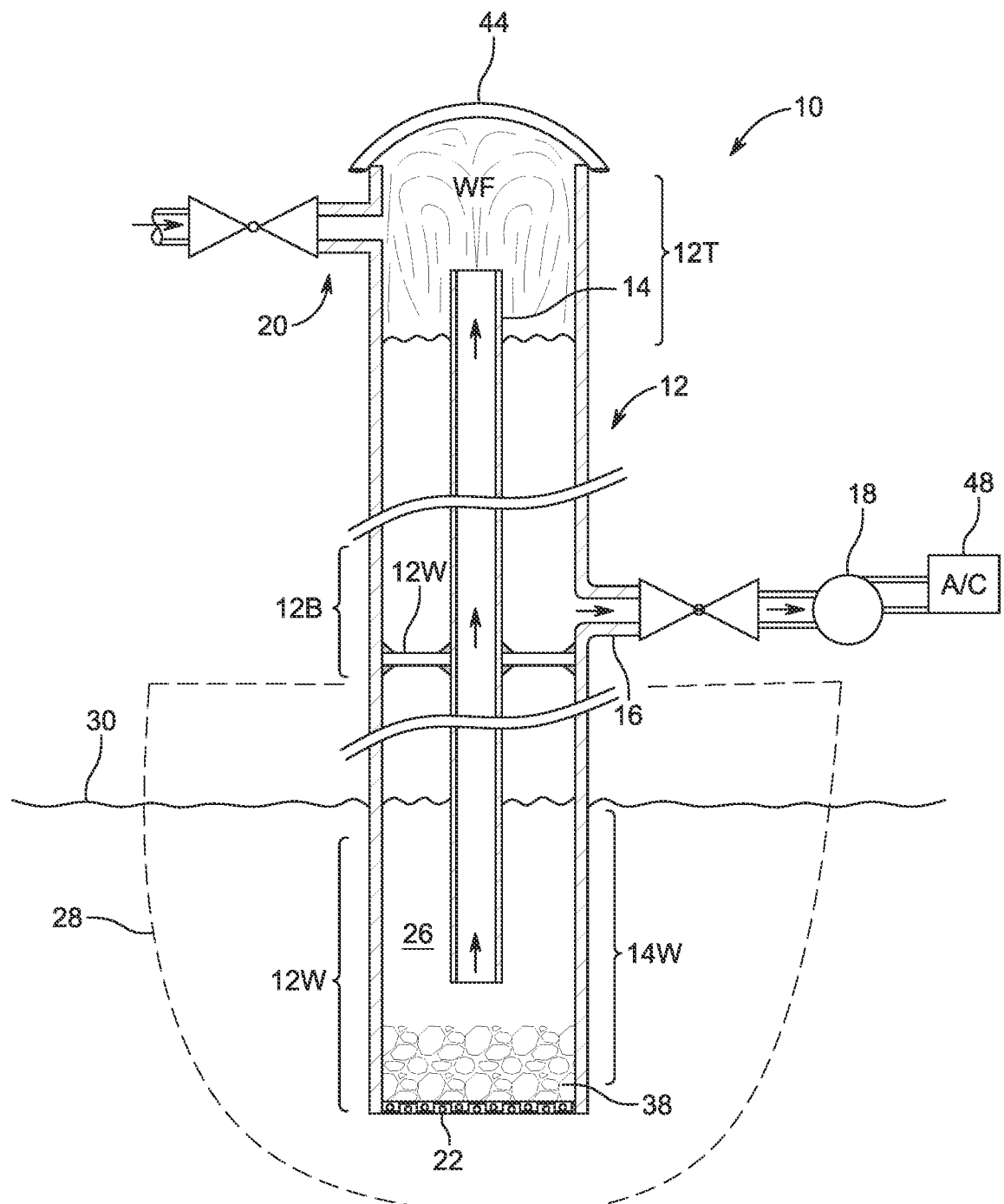
FIG. 2 is a schematic view of the negative pressure aeration and organic growth suppression system installed outside the confines of a boat such as on the boat's swim platform or on the boat dock.

As shown in FIG. 2, another embodiment of the negative pressure aeration and organic growth suppression system 10 is intended to be installed outside the confines of a boat 30 and comprises a watertight housing 12 having an inlet port 14 and an outlet port 16. The housing 12 preferably comprises a generally circular cylindrical pipe having a top portion 12T and a bottom portion 12B that is vertically oriented when installed such that the inlet port 14 is elevationally oriented above the outlet port 16; more preferably, with the inlet port 14 positioned at the top portion 12T of the housing 12 and the outlet port 16 positioned at the bottom portion 12B of the housing 12. A solid transverse wall 12W sealingly extends transversely within the housing 12 to define the bottom of the bottom portion 12B.

The inlet port 14 preferably comprises a generally circular cylindrical pipe extending co-axially within the housing 12 sealingly through the transverse wall 12W to a point below sea level to be fluidly connected to the seawater. A conventional marine pump 18 is fluidly connected to the outlet port 16 to create a negative pressure at the outlet port 16 thereby drawing seawater into the housing 12 via the inlet port 14.

As in the case of the earlier embodiment, the operational specifications of the pump 18 relative to the dimensions of the housing 12 and ports 14 & 16 are designed to impart a waterfall flow of seawater from the inlet port 14 within the housing 12 by creating sufficient negative pressure within the housing 12 to create the waterfall flow of seawater from the inlet port 14 based upon the dimensions of the housing 12 and ports 14 & 16 and the flow velocity, viscosity, density of seawater. It is noted that during start-up, it may be necessary to add water to the housing 12 via a primer inlet 20 to prime the housing 12 initiating water flow.

As mentioned above, the inlet port 14 extends co-axially within the housing 12 sealingly through the transverse wall 12W to a point submerged below sea level (reference 14W representing the portion of the inlet port 14 extending below sea level). Correspondingly, the housing 12 preferably comprises an elongated housing having a lower portion 12W extending below sea level—the portions 12W and 14W preferably being concentrically oriented.

A strainer 22 is optionally installed within the inlet port 14, preferably at the bottom open end of the lower portion 12W of the housing 12 just below the bottom open end of the lower portion 12W of the inlet port 14 to strain seawater before entering the inlet port 14. Further, the lower portion 12W of the housing is preferably filled with a prefilter 38 such a granulated particulate (e.g., pumice rocks) to a depth above the bottom open end of the lower portion 14W of the inlet port 14 such that the interstitial spaces within the particulate trap unwanted marine debris from entering the inlet port 14).

Figure 2A:
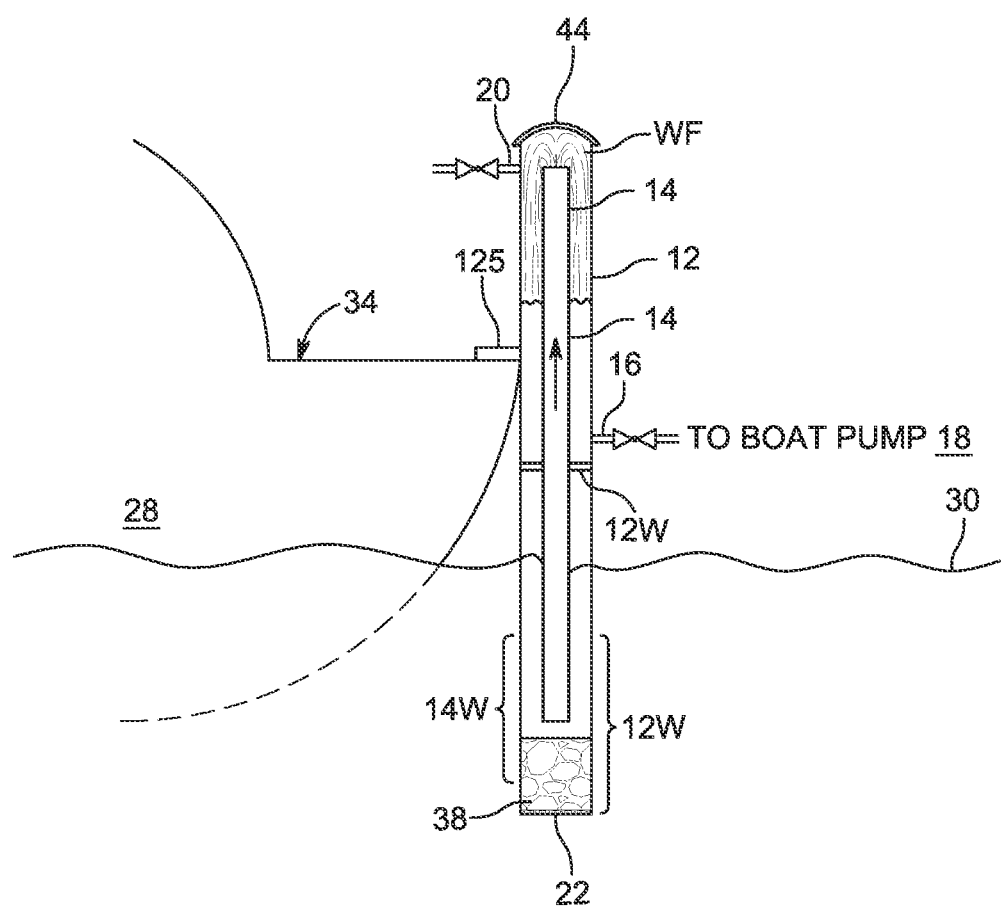
FIGS. 2A, 2B and 2C are elevational views showing the negative pressure aeration and organic growth suppression system respectively mounted to the boat's swim platform, mounted to the boat dock and in the form of a portable inverted T configuration.
Figure 2B:
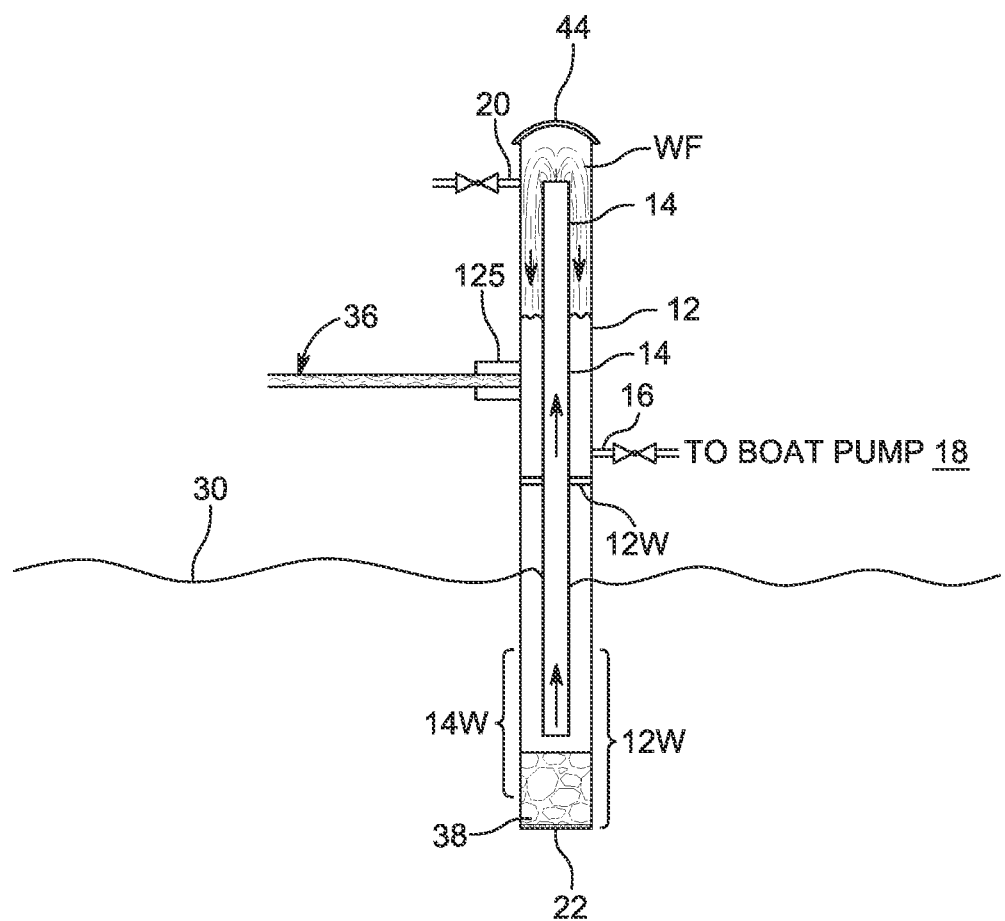
Figure 2C:
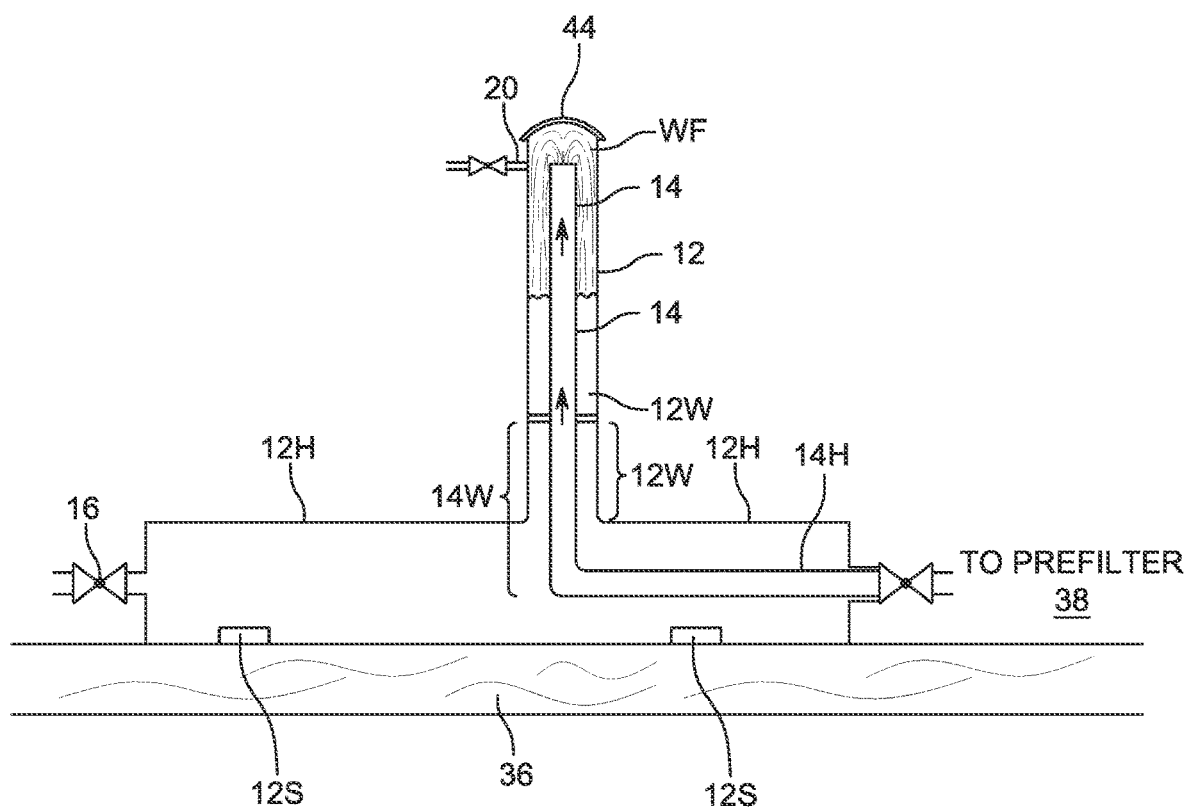

As shown in FIG. 2A, the housing 12 of the embodiment of FIG. 2 may be mounted relative to the swim platform 34 of the boat 28 by means of an appropriate support mount 12S elevationally above the waterline 30 of the waterline 30 with the lower portions 12W and 14W extending downwardly below the waterline 30 in such manner that the lower portions 12W and 14W remain submerged at all times since the housing 12 is affixed to the swim platform 34 of the boat 28. Alternatively, as shown in FIG. 2B, the housing 12 may be mounted relative to the boat dock 36 via the support mount 12S with the lower portions 12W and 14W being long enough to always be submerged in the seawater (i.e., below the lowest anticipated low tide). A further alternative is shown in FIG. 2C, wherein the housing 12 comprises an inverted T pipe configuration including an additional horizontal portion 12H (e.g., composed of conventional PVC pipe fittings) with the inlet port 14 correspondingly extending horizontally and concentrically therein and fluidly connected to a source of seawater, such as a floating prefilter 38. The inverted T pipe configuration of the housing 12 is supported in its upright orientation by a mounting stand 12S. In this alternative, the housing 12 may be removably seated onto the swim platform 34, boat dock 36 or elsewhere and moved around thereon as desired or removed entirely for storage during non-use.

In each of these embodiments, the inlet port 14 is elevationally higher than the pump 18 to maximize the pump's 18 efficiency due to a pressure siphon effect. As such, the system 10 is able to create a vertical height differential, thus allowing an atmospheric siphon pressure gradient to form, which allows the seawater to be effectively "pushed" into the pump 18, by way the inlet port 14 being vertically higher than the pump 18. Since the seawater is pushed into the pump 18, the pump 18 necessarily uses less energy to provide sufficient fluid flow into the rest of the air conditioning system.

More specific embodiments of the negative pressure aeration and organic growth suppression system 10 are now described in greater detail.

As shown in FIGS. 3-10, housing 12 includes an inlet port 14 and an outlet port 16. The inlet port 14 is fluidly connected via an inlet hose 14H to the boat's 18 seacock 32 to allow, when opened, seawater to flow through the inlet hose 14H into the inlet port 14 of the housing 12. The outlet port 16 is fluidly connected via an outlet hose 16H to the suction input 18I of a conventional seawater pump 18.

In operation, pump 18 creates a negative pressure in the outlet hose 16H and correspondingly within the housing 12. With seacock 32 being open and pump 18 operating, the negative pressure created within the housing 12 draws seawater through inlet hose 14H, through the inlet port 14 into the housing 12.

The inlet port 14 is positioned within the top portion 12T of the housing 12 whereas the outlet port 16 is positioned within its bottom portion 12B. The housing 12 is mounted within the boat 28 above the boat's waterline 30 with the inlet port 14 being elevationally oriented higher than the outlet port 16.

While the pump 18 is operating (and below-waterline seacock 32 opened), seawater is drawn into the inlet port 14 and waterfall flows downwardly within the housing 12 to the outlet port 16 connected to the pump 18. The operational specifications of the pump 18 relative to the dimensions of the housing 12 and ports 14 & 16 impart a waterfall flow WF of seawater from the inlet port 14 within the housing 12. The waterfall flow WF aerates the incoming seawater to substantially reduce, or eliminate altogether, marine growth. It is noted that during start-up, it may be necessary to add water to the housing 12 via the primer inlet 20 to prime the housing 12 initiating waterfall flow.

Optional strainer 22 comprises a dome-shaped configuration and is positioned within the housing 12 about the inlet port 14 to define an unstrained water chamber 40 internal to the housing 12. The strainer 22 strains larger marine debris in the waterfall flow WF (i.e., unstrained water), with the resulting strained water dropping downward to the outlet port 16. A cleanout port 44 is provided for manually gaining access to the unstrained water chamber to periodically remove any accumulated debris. The lid 44L of the cleanout port 44 may be translucent or transparent to be able to visually see when cleanout is needed. An antibacterial, ultraviolet or other lighting system 44S may optionally be incorporated into the lid 44L to shine onto the waterfall flow WF within the housing 12.

The aerated and strained seawater exiting the outlet port 16 flows via the outlet hose 16H through the pump 18 through hose 46 to supply aerated and strained seawater to the on-board air conditioning system 48 or other system as needed.

Figure 3:
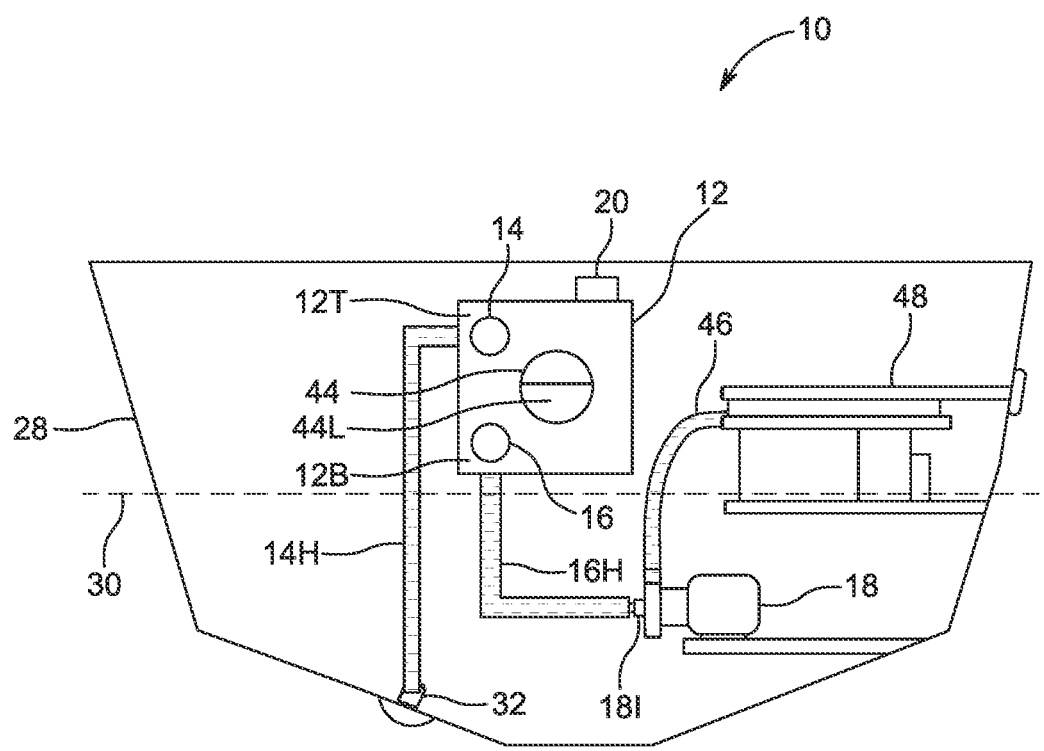
FIG. 3 is a schematic view of the top plan view of the negative pressure aeration and organic growth suppression system installed within the confines of a boat.
Figure 4:
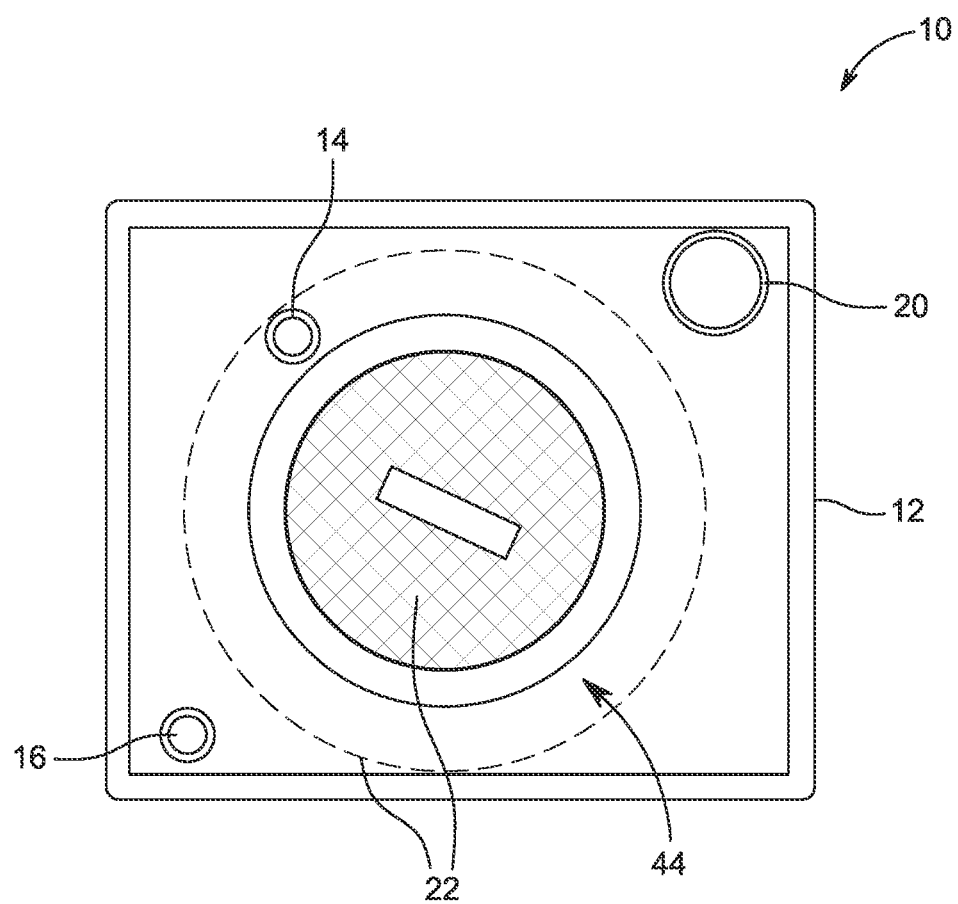
FIG. 4 is a top plan view of the housing showing the inlet port being positioned elevationally above the outlet port, showing the primer port and showing the access port.

More particularly, as better shown in FIGS. 2 and 3, the strainer 22 is located within the housing 12. The strainer 22 is preferably a single strainer, dome-shaped and composed of stainless steel or a heavy-duty plastic material. Further, the strainer 22 includes a multitude of sieve holes, designed to be small enough to catch debris before exiting the outlet port 16.

The strainer 22 may be configured to have varying other geometries such as an irregular cylinder-like object, perfect cylinder, cone-shaped cylinder, reverse cone-shaped cylinder and/or any object with multiple sides that can be linear or nonlinear. For instance, the strainer 22 may have an upper body with the geometry of a square and a lower body with the geometry of a cylinder, which may be removed all at once or piece-wise. Furthermore, multiple layers of strainers 22 within a single strainer is contemplated and may be used for the purpose of sifting larger through smaller objects. The varying layers of the strainer 22 may then be removed all at once or piece-wise. The system may further include multiple strainers 22. The strainers 22 may also be coated with anti-fouling liquids for the purposes of decreasing the growth of organic matter and/or rust. For example, having a disposable strainer 22 composed of inexpensive material, such as plastic, coated with Barnacle Buster® and other chemicals for the purposes of slowly leaching the chemicals into the system's fluids while in operation. The strainer 22 may also have disposable coatings attached to itself. That is, a disposable strainer 22-shaped material is added to the strainer 22 for the purposes of acting as a further sieve or chemical leaching component. Once the user has flushed the system, the user may remove the disposable material.

The housing 12 includes a primer inlet 20 that allows priming water to be added to the housing 12. For instance, if the system needs to be primed, to perfect both a water and air tight seal, the user may add additional water to the system by opening the primer inlet 20. The primer inlet 20 further includes the ability to allow a user to add anti-fouling liquids and other chemicals to the system, for the purposes of cleaning and/or flushing the system. The primer inlet 20 is preferably composed of a traditional cap and screw configuration. Furthermore, the primer inlet 20 is located within the housing 12; however, not within the volume encompassed by the strainer 22.

Notably, the inlet port 14 is within the volume encompassed by the strainer 22, while the outlet port 16 is not within the volume encompassed by the strainer 22. The unstrained fluid 40 exits the inlet hose 14H via the inlet port 14 and into the strainer 22, whereby the unstrained fluid 40 passes through the sieve holes of the strainer 22 and exits the housing 12 via the outlet port 16. The force generated by the pump 18 allows waterfall flow WF to occur within the housing 12. When the unstrained fluid 40 enters the housing 12 through the inlet port 14, the unstrained fluid 40 then falls, via gravity, through the strainer 22 and out of the housing 12 via the outlet port 16. The waterfall effect provides an aeration method for the unstrained fluid 40. That is, the waterfall effect creates a mixture of unstrained fluid 40 and air in between the inlet port 14 and the outlet port 16. The mixture of unstrained fluid 40 and air allows less surface area of the system to be covered by unstrained fluid 40, thus providing for less time for organic matter to accumulate on the surfaces of the system 10.

Figure 5:
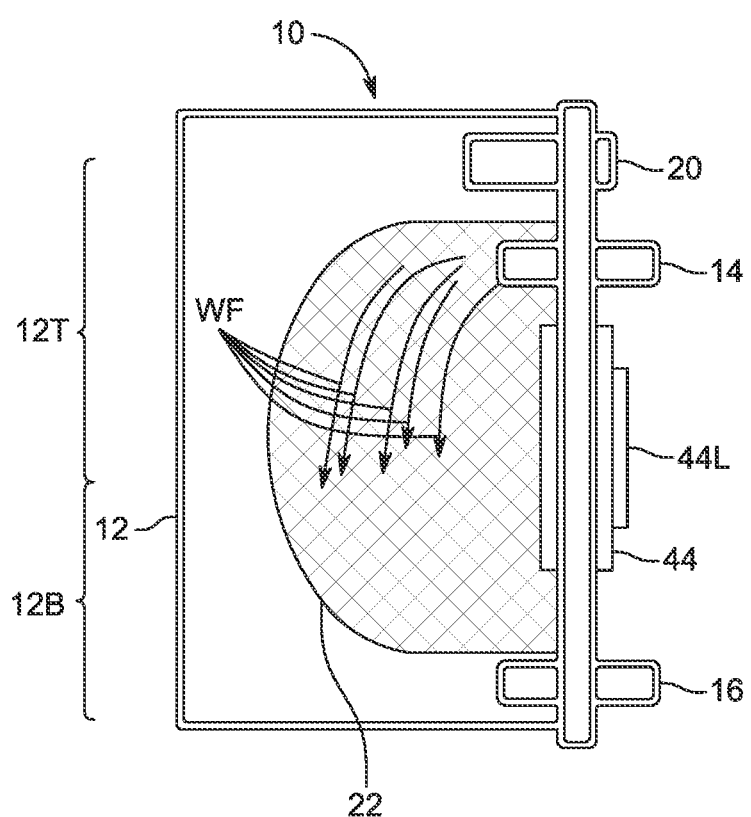
FIG. 5 is side cross-sectional view of the housing showing the waterfall flow of water from the inlet port within dome-shaped strainer.
Figure 6:
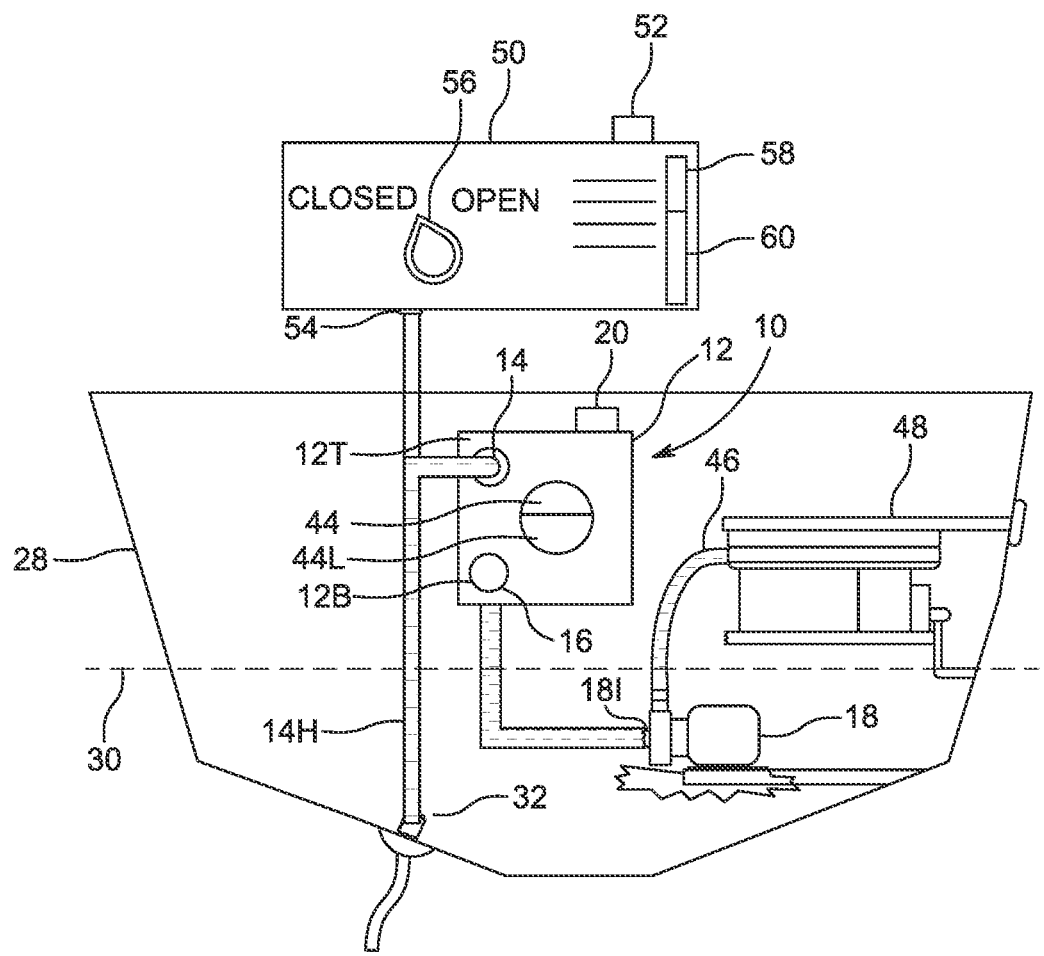
FIG. 6 is a schematic view of the system with the pump switched to an operational position and the chemical tank switched to a non-operational position.
Figure 7:
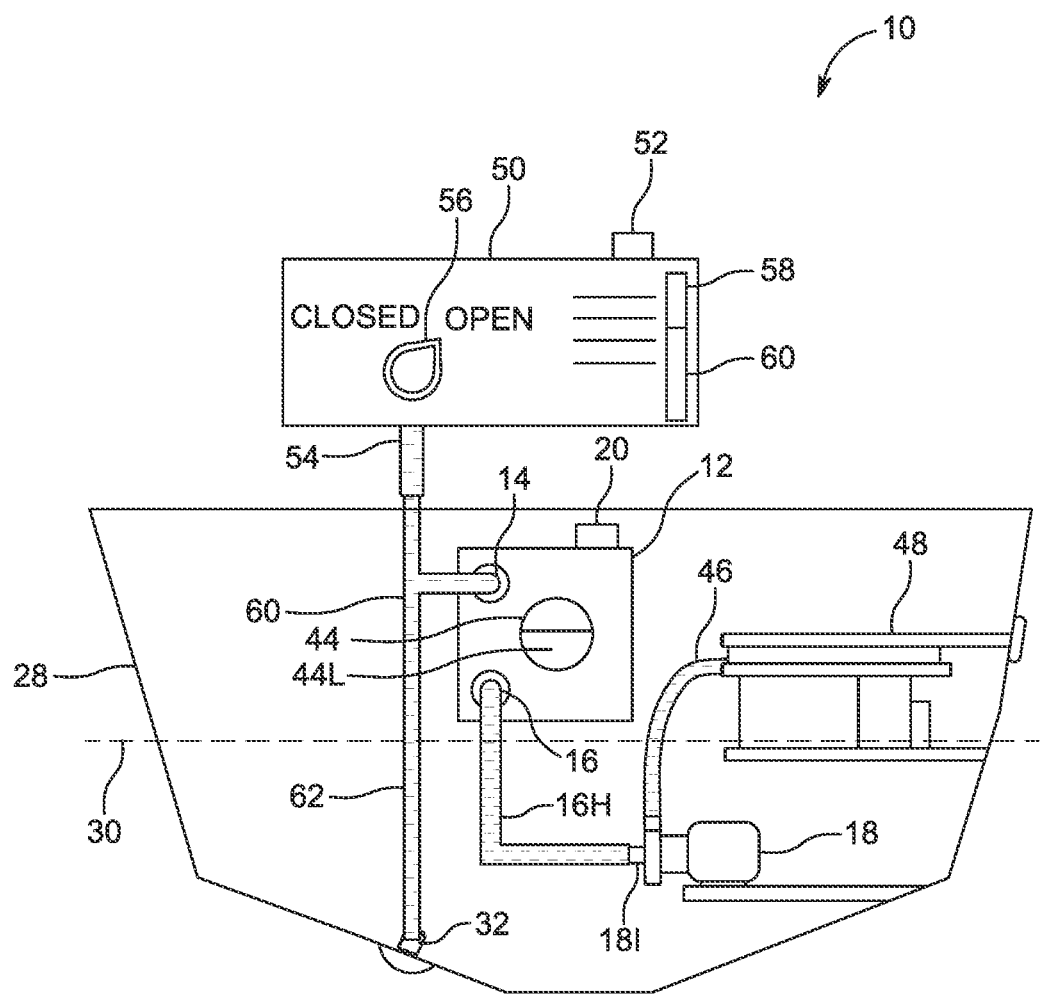
FIG. 7 is a schematic view of the system with the pump switched to a non-operational position and the chemical tank switched to an operational position.

A chemical tank 50 may be added to the system for anti-fouling purposes. The chemical tank 50 is connected to the inlet hose 14 at any portion along the length of the inlet hose 14. Preferably, the chemical tank 50 is located above the waterline 46 to prevent any water damage from leakage, humidity and/or spilled chemicals. The chemical tank 50 includes a volume display 58 that shows the amount of chemical 60 left in the tank 50. The tank 50 has a drain valve 56 that allows a user to open or close the tank 50 to allow the chemical 60 to be distributed throughout the system, via the tank outlet 54. When the valve 56 is opened (as shown in FIG. 5), the chemical 60 is forced into the inlet hose 14, by way of gravity and the force of the pump 18. The chemical 60 then distributes into the system with the same pattern as the unstrained fluid 40 and strained fluid 42. When the valve 56 is closed, the system 2 operates as if the tank was not connected to the system 2. The chemical 60 is added to the tank 50 via the tank access port 52.

When the valve 56 is opened, the combination of unstrained fluid 40, strained fluid 42 and the chemical 60 forms a chemical mixture 62. The mixture 62 may be a mixture of unstrained fluid 40 and an anti-fouling liquid, such as Barnacle Buster®, as the chemical agent 60. Furthermore, the ratio of unstrained fluid 40, strained fluid 42 and chemical agent 60 composes the chemical mixture 62 and may be of any ratio. That is, inlet hose 14 may have a volume of 99% unstrained fluid 40 and only 1% of chemical agent 60, at the beginning of the system. When the mixture 62 leaves the housing 12 via the outlet port 16, the mixture 62 is composed of strained fluid 42 and chemical 60.

Figure 8:
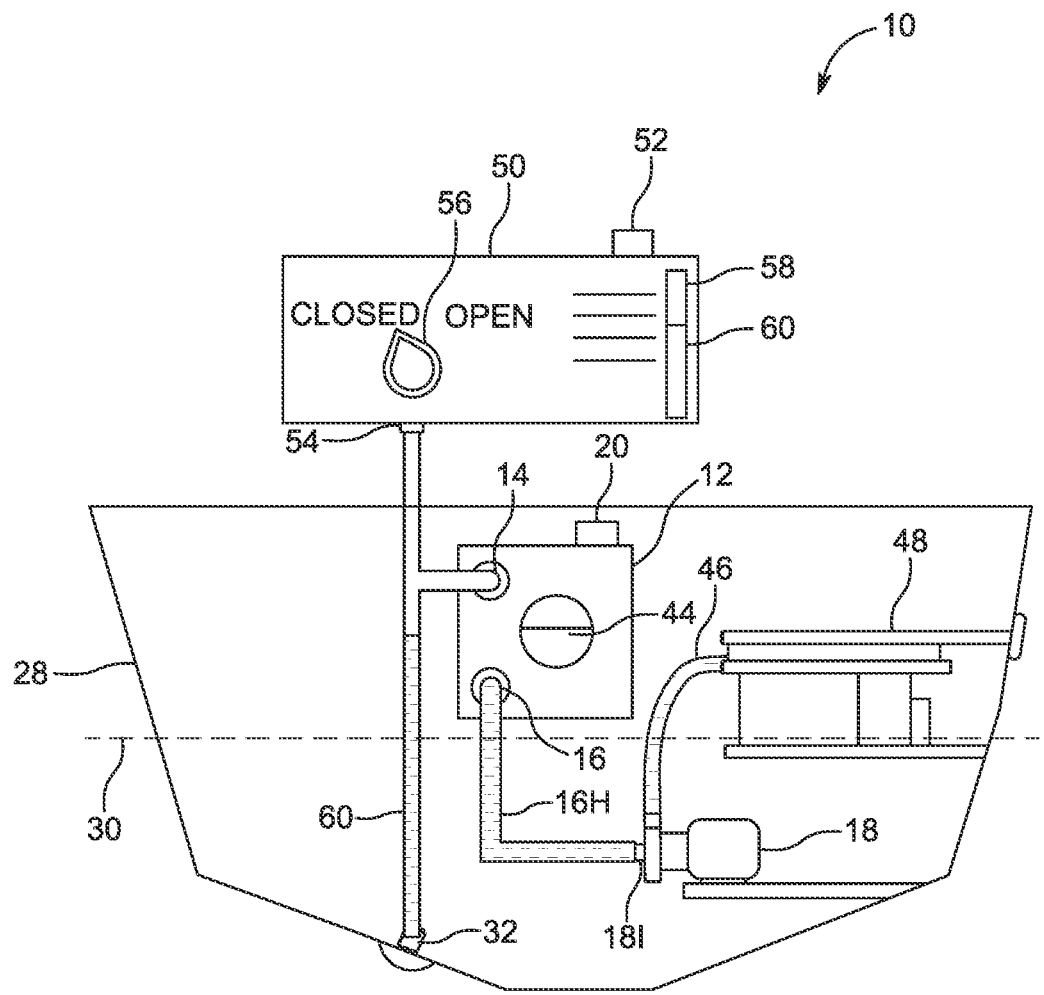
FIG. 8 is a schematic view of the system with the pump switched to a non-operational position for a period of time longer than the chemical tank switched to a non-operational position.

As shown in FIG. 8, the valve 56 is switched to an off position, after the valve 56 has been open for a considerable period of time. The pump 18 has also been turned off for a longer period of time than the valve 56 has been opened, before switching to an off position. The chemical agent 60 is then free to fill the system, ridding the system of any unstrained 40 or strained fluid 42. The chemical agent 60 is then allowed to reach equilibrium, in view of the system's components.

Figure 9:
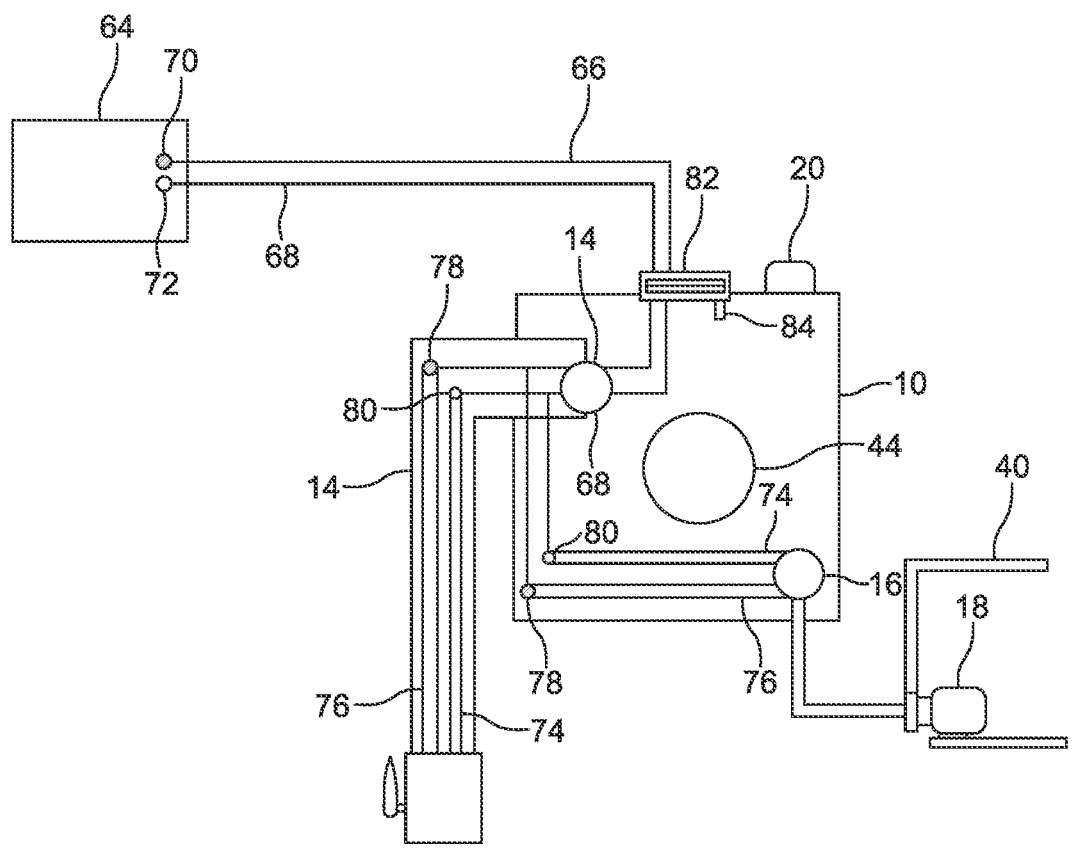
FIG. 9 is a non-operational schematic view of the system with the inclusion of the DC power supply, corresponding electrodes and vacuum switch.
Figure 10:
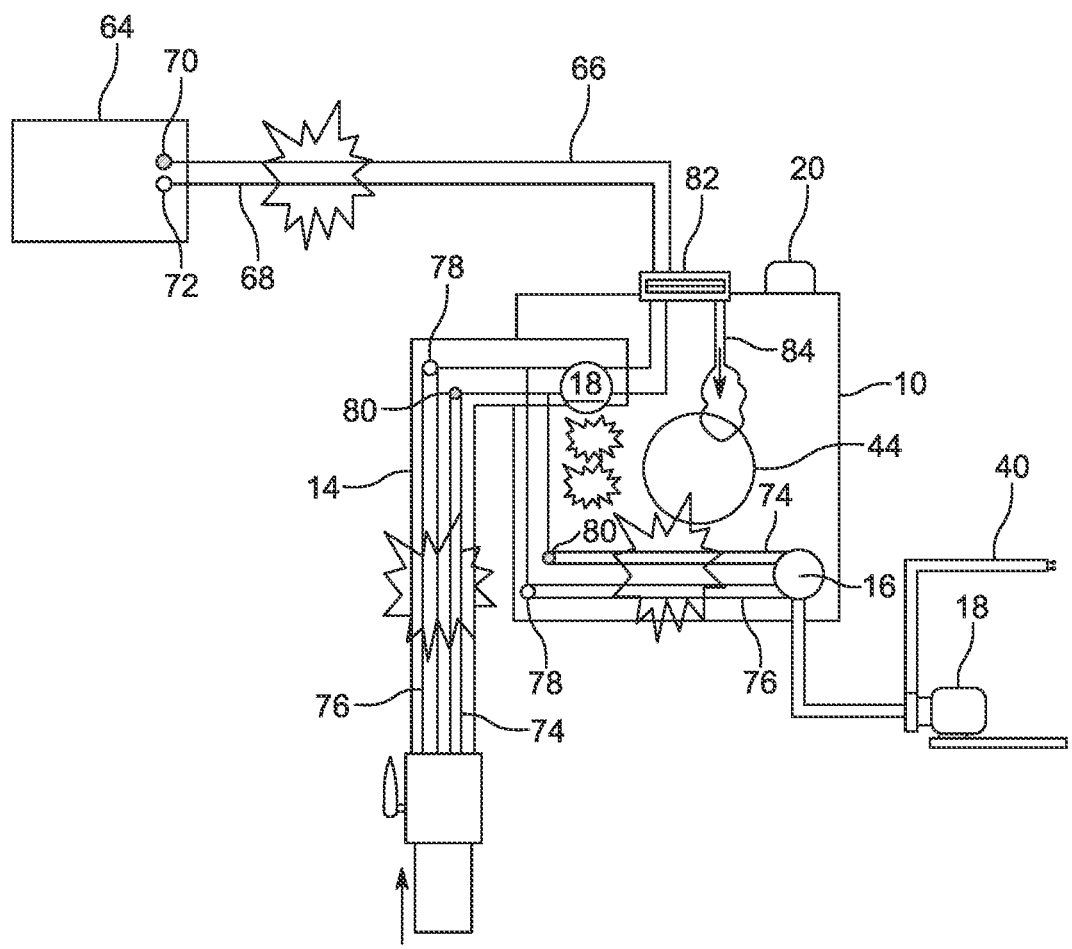
FIG. 10 is an operational schematic view of the system with the inclusion of the DC power supply, corresponding electrodes and vacuum switch.

As shown in FIGS. 9 and 10, the system may optionally include an anti-fouling electrode assembly. This includes a DC power supply 64 that provides the energy for the anti-fouling system. Also included are negative 66 and positive 68 wires that connect to the power supply's 64 negative terminal 70 and positive terminal 72, respectively. The negative 66 and positive 68 wires are further connected to the vacuum switch 82. The vacuum switch 82 allows a pressure gradient to be monitored within the system 10 via the vacuum port 84. When a gradient is formed within the system 10, the pressure valve 82 activates, which then activates the corresponding electrodes within the system 10. The vacuum switch 82 is further connected to multiple conductive wire electrodes 74 and 76. Specifically, the vacuum switch 82 has a negative wire 66 connected to a negative wire electrode 74, via a negative terminal electrode 80, located within the inlet hose 14 and a positive wire 68 connected to a positive wire electrode 76, via a positive terminal electrode 80, located within the inlet hose 14. Both conductive wire electrodes 76 and 74 may be the entire length of the inlet hose 14 or a length less than the length of the inlet hose 14. The two wire electrodes 76 and 74 are further included within the system 10 and connected to positive and negative electrode terminals 78 and 80, respectively, located within the system 10. The two wire electrodes 76 and 74 may run the length of the system 10 or may be a length less than the length of the system 10. Furthermore, the two wire electrodes 76 and 74 may create a spiral pattern within the system 10 or may compose the entire surface area of the system 10. Notably, the two wire electrodes 76 and 74 would not encompass the entire volume of the system 10.

As shown in FIG. 10, when the pump 34 is operational, a vacuum condition is created within the system 10. The vacuum is sensed by the vacuum port 84, thus allowing the vacuum switch 82 to activate the wire electrodes 74 and 76. The activated wire electrodes 74 and 76 then create an anti-fouling environment within the inlet hose 14 and system 10 to eliminate, either partially or completely, organic growth of organic matter.

Figure 11:
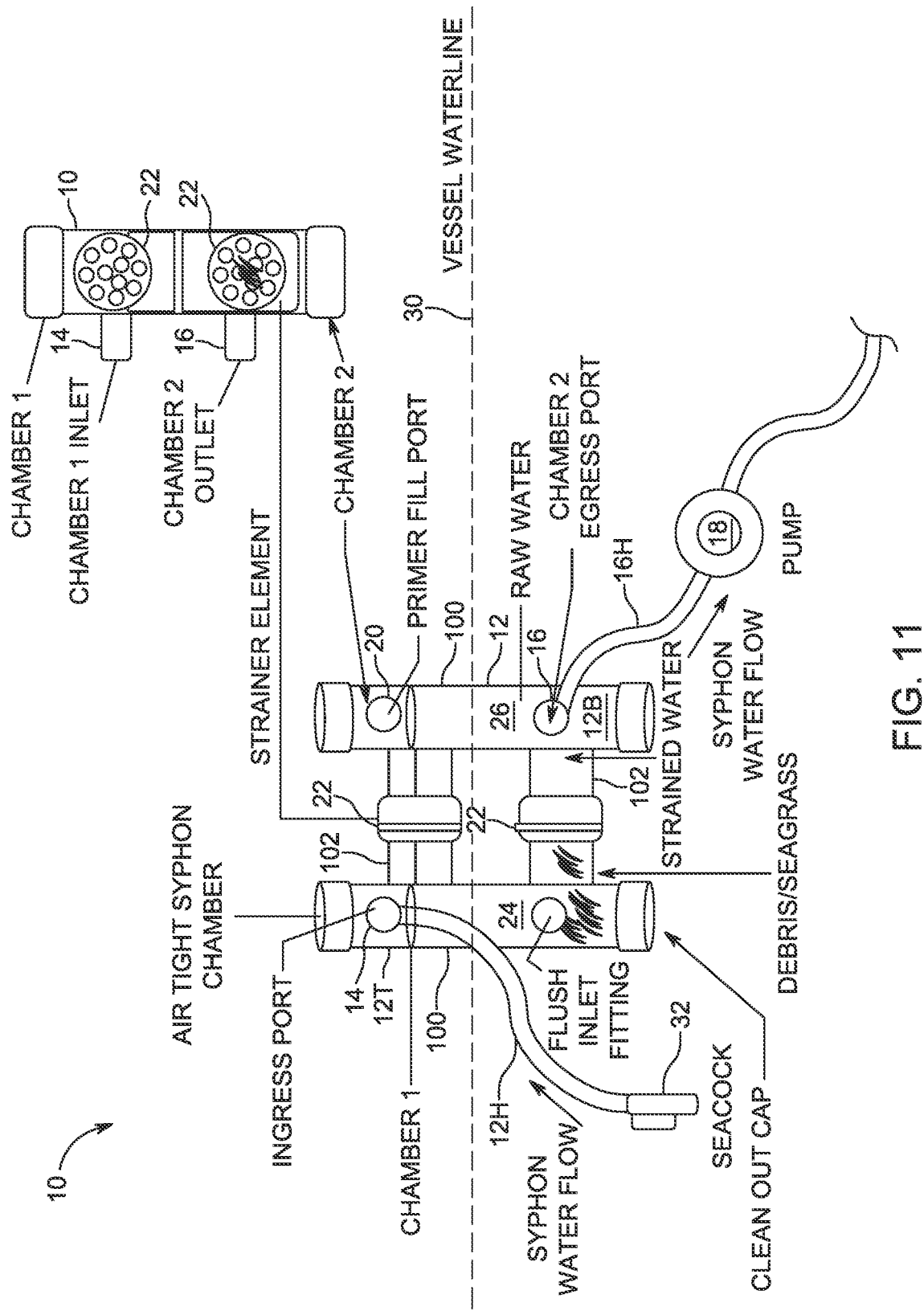
FIG. 11 is a side elevational view of another embodiment of the system wherein the housing is composed of off-the-shelf PVC pipe fittings.

Another embodiment of the system is shown in FIG. 11, housing 12 may be composed of off-the-shelf PVC pipe fittings. More specifically, a plurality of pipe fittings are arranged and interconnected as shown in FIG. 11; namely, comprising a pair of vertical pipes 100 interconnected by a pair of horizontal pipes 102, with at least one strainer 22 positioned in each horizontal pipe 102. Inlet port 14 is positioned in the top area of one of the vertical pipes 100 to define an unstrained Chamber 1 comprised of the volume within the housing upstream of the strainers 22 (hereinafter "unstrained chamber" or "Chamber 1"). The volume within the housing downstream of the strainers 22 is correspondingly referred to as the "strained chamber" or "Chamber 2". The inlet port 14 draws seawater from the boat's seacock 32 due to the negative pressure created by the seawater pump 18, into the vertical pipe 100 to which it is fluidly connected.

Outlet port 16, positioned in the bottom of one of the other vertical pipes 100 in which the inlet port 14 is not located, is fluidly connected to the seawater pump 18 to create suction pressure within the housing 12. Upon operation of the pump 18, negative pressure causes a waterfall flow WF of water from the inlet port 14 into the unstrained chamber composed of the vertical pipe 100.

Figure 12:
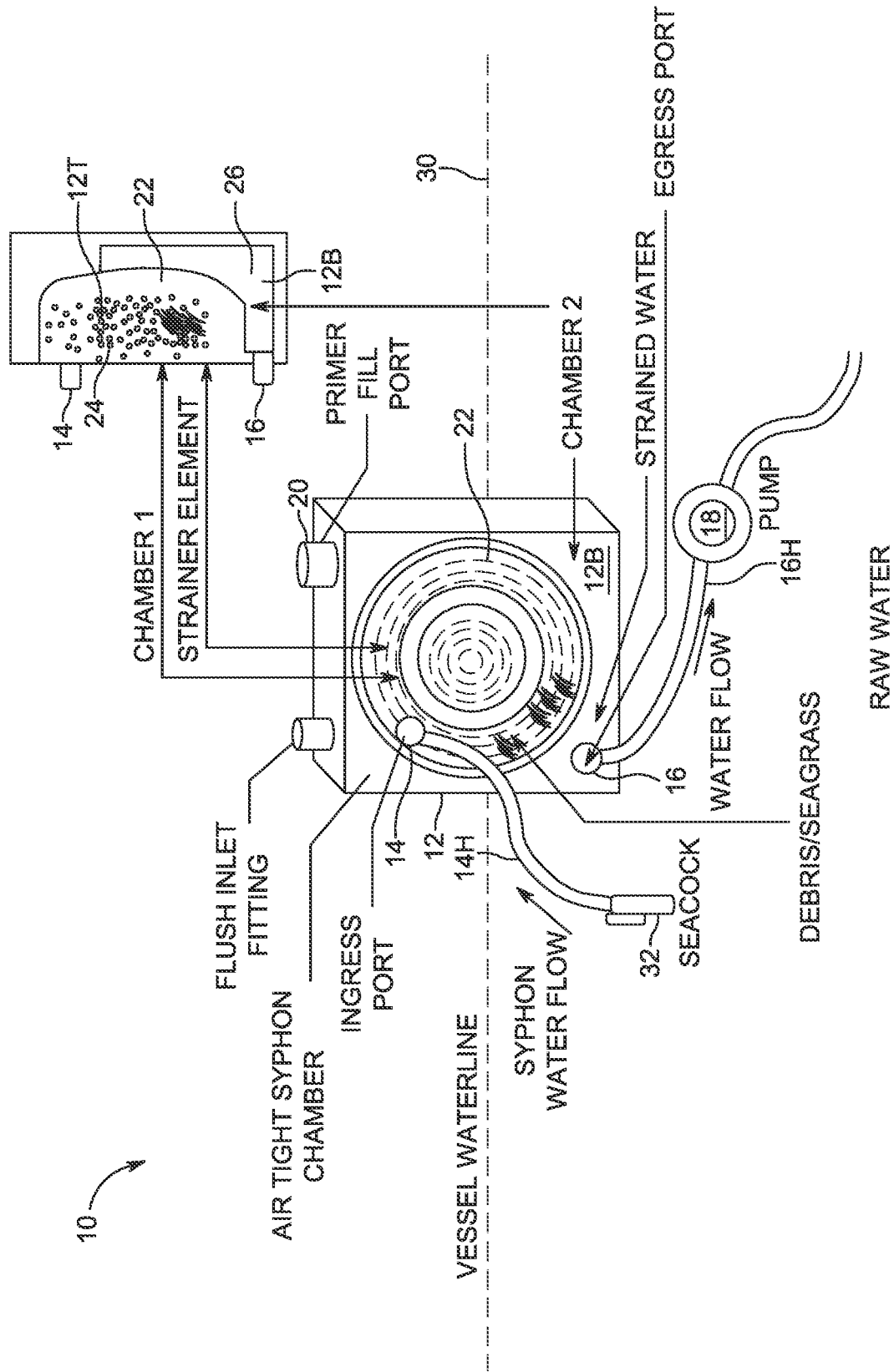
FIG. 12 is a schematic view of FIG. 1 showing the placement of the housing relative to the waterline of the boat.

The similar functional aspects of the embodiment of FIG. 11 compared to FIG. 12 (schematically representing FIGS. 3-10), include defining Chamber 1 as including the volume between the inlet port 14 and the strainer 22 wherein the waterfall flow WF occurs, and defining Chamber 2 as including the volume between the strainer 22 and the outlet port 16.

Figure 13:
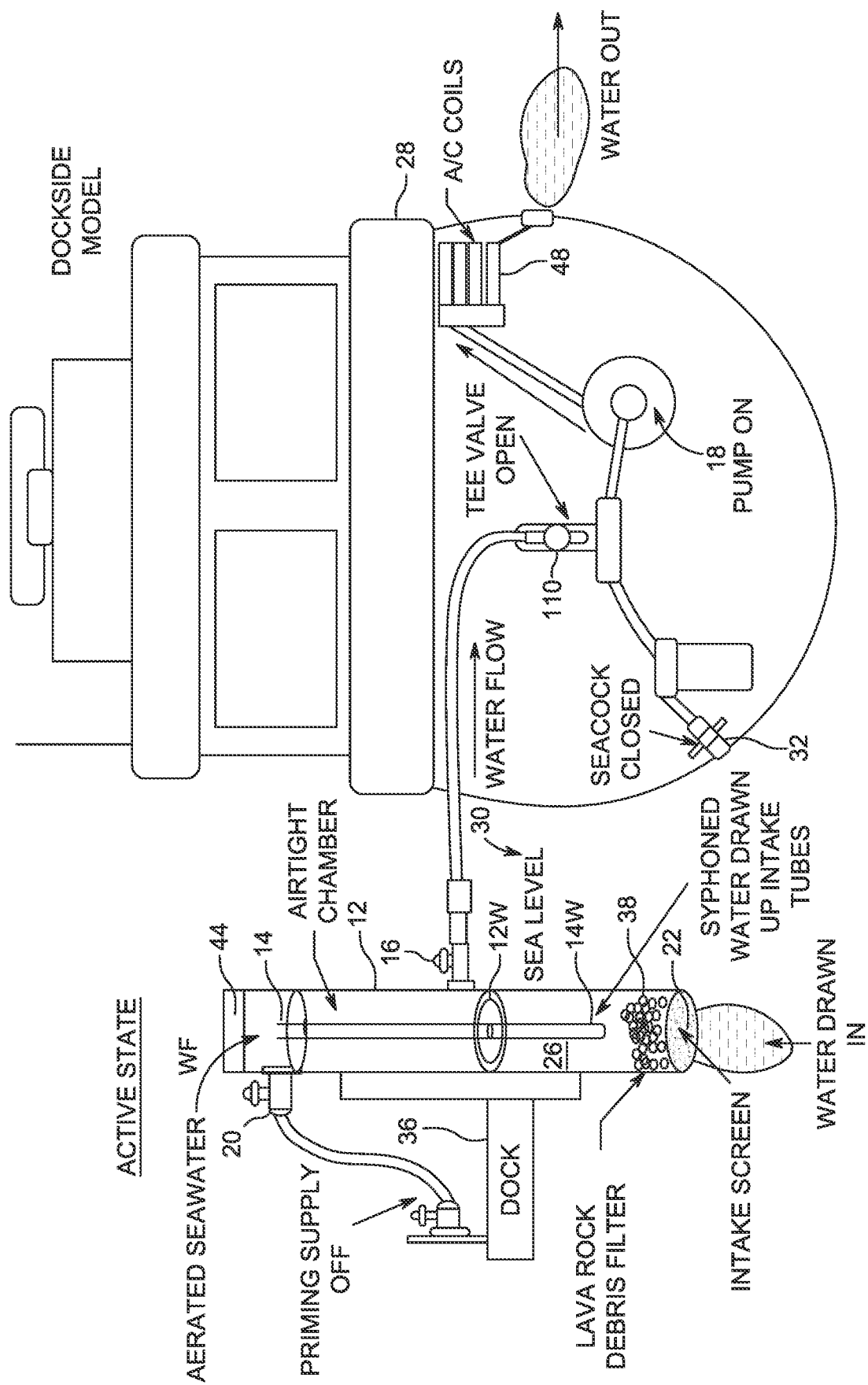
FIG. 13 is a schematic view of another embodiment of the system installed outside the confines of a boat such as optionally being dock-mounted or swim platform-mounted.

FIG. 13 shows the embodiment of FIG. 2 mounted dockside (see FIG. 2B) and the manner in which it is operationally connected to the boat 28. More particularly, a tee valve 110 needs to be fluidly connected inline between the seacock 32 and the pump 18 and with the tee port 112 fluidly connected to the outlet port of the housing 12, preferably through the use of quick disconnect fittings or the like for ease in assembly and disassembly. During initial use tee valve 110 is opened and the seacock 32 is closed. Next the housing 12 needs to be primed so the primer inlet 20 is opened to allow supply water from a water faucet or the like to fill the housing 12 (and the tee valve 110, pump 18, etc.) to fill up to the point of overflowing into the inlet port 14. The primer inlet port 16 is then closed. Operation of the pump 18 draws water from within the housing 12 which draws seawater up through the inlet port 16 to impart a waterfall flow of water in the top portion 12T of the housing 12 the boat 28, which in turn aerates the seawater as it flows downwardly to the bottom portion 12B and drawn out of the outlet port 16 by pump 18.

As noted above, the operating characteristics of the system are designed such that waterfall flow from the inlet port 14 occurs within the housing 12.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A negative pressure aeration and organic growth suppression system for a vessel floating on a natural body of water, the vessel comprising a water-to-water heat exchanger fluidly connected to an outlet of a water pump to flow water therethrough from the natural body of water, comprising a watertight housing including:
   an inlet port positioned at a top portion of the housing;
   an outlet port positioned at a top portion of the housing such that said inlet port is elevationally oriented above the outlet port;
   said inlet port fluidly connected to the natural body of water; and
   said outlet port fluidly connected to an inlet of the pump to draw water through said outlet port creating a waterfall flow of water within the housing from said inlet port.

2. The system as set forth in claim 1, wherein the flow rate of the pump relative to the dimensions of said housing, said inlet port and said outlet port impart said waterfall flow of water within the housing from said inlet port within said housing by creating sufficient negative pressure within said housing to create the waterfall flow of water within the housing from the inlet port.

3. The system as set forth in claim 1, wherein said housing is mounted within the confines of the vessel.

4. The system as set forth in claim 1, wherein said housing is mounted outside the confines of the vessel.

5. The system as set forth in claim 1, wherein said housing is installed within the vessel above the waterline of the water and lower than the pump to maximize the pump's efficiency due to a pressure siphon effect.

6. The system as set forth in claim 1, wherein said housing is installed outside the vessel above the waterline of the water and lower than the pump to maximize the pump's efficiency due to a pressure siphon effect.

7. The system as set forth in claim 1, further including a strainer for straining marine debris from the water.

8. The system as set forth in claim 7, wherein said strainer is positioned within said housing between said inlet port and said outlet port to define an internal unstrained water chamber within said housing between said inlet port and said strainer and to define a strained water chamber within said housing between said outlet port and said strainer.

9. The system as set forth in claim 7, wherein said strainer is positioned fluidly upstream of said inlet port to strain incoming water before flowing through said inlet port into said housing.

10. The system as set forth in claim 1, wherein said housing comprises a first pipe vertically oriented such that said inlet port is oriented below the outlet port with said inlet port positioned at said top bottom portion and said outlet port positioned at said bottom upper portion.

11. The system as set forth in claim 10, wherein said housing further comprises a second pipe having an inlet fluidly connected to the water and an outlet comprises said inlet port, wherein water pumped from said outlet port creates said waterfall flow of water from said outlet of said second pipe within said first pipe.

12. The system as set forth in claim 11, wherein said second pipe is positioned longitudinally relative to said first pipe.

13. The system as set forth in claim 12, wherein said second pipe is positioned longitudinally within said first pipe.

14. The system as set forth in claim 13, wherein said housing further comprises a solid transverse wall sealingly extending within said housing.

15. The system as set forth in claim 14, wherein said second pipe having an inlet fluidly connected to the water comprises extending said second pipe into the body of water.

16. The system as set forth in claim 15, further including a strainer installed relative to said inlet of said second pipe.

17. The system as set forth in claim 16, further including a prefilter installed relative to said inlet of said second pipe.

18. The system as set forth in claim 17, wherein said prefilter is installed relative to a bottom open end of a lower portion of said inlet port to strain seawater before entering said inlet port.

19. The system as set forth in claim 15, wherein said housing is mounted by a support mount to a swim platform of the vessel.

20. The system as set forth in claim 15, wherein said housing is mounted by a support mount so a dock proximate to the vessel.

21. The system as set forth in claim 15, further including a support stand for said housing.

22. The system as set forth in claim 21, wherein said housing comprises an inverted T pipe configuration including an additional horizontal portion with said inlet port fluidly connected to the water.

23. The system as set forth in claim 1, further including an access port to the housing.

24. The system as set forth in claim 1, further including a chemical tank fluidly connected to said housing.

25. The system as set forth in claim 1, further including an anti-fouling electrode assembly.

\* \* \* \* \*